W. H. THIEMER.
UNIVERSAL JOINT.
APPLICATION FILED APR. 4, 1919.
1,366,038.
Patented Jan. 18, 1921.
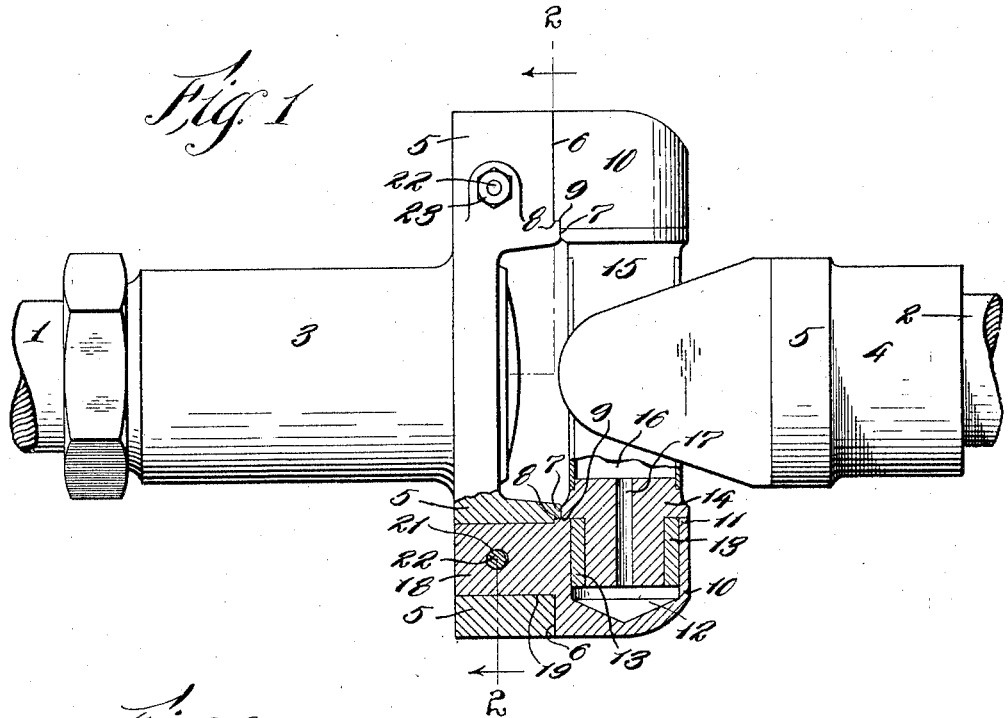
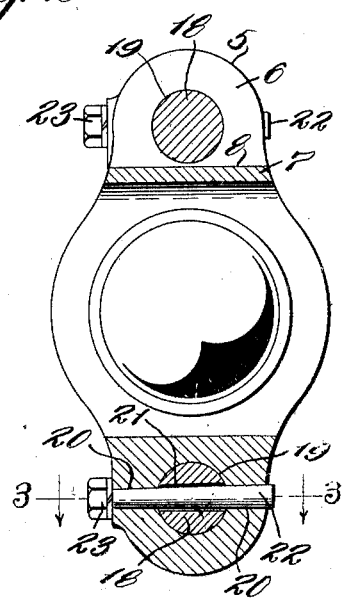
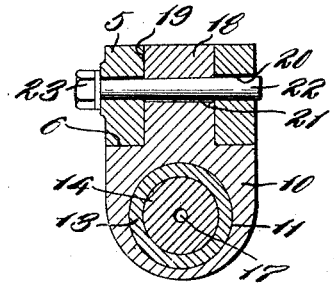
Inventor
William H. Thiemer,
By Hull, Smith, Brock & West.
Attys.

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,366,038.      Specification of Letters Patent.      Patented Jan. 18, 1921.

Application filed April 4, 1919. Serial No. 287,560.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints of the type wherein a pair of shaft sections are connected by a cross member having trunnions mounted in bearing blocks which are detachably mounted upon a supporting base or flange carried by each shaft section. It is the object of the invention to provide simple, effective, and economical means for securing the bearing blocks to their supporting bases. I accomplish the foregoing objects in and through the construction illustrated in the drawings forming a part hereof, wherein Figure 1 represents an elevation of two shaft sections united by a universal joint embodying my invention, certain parts being shown in section; and Figs. 2 and 3 sectional views corresponding respectively to the lines 2—2 and 3—3 of Figs. 1 and 2.

Describing the various parts by reference characters, 1 and 2 denote the shaft sections which are united by the universal joint and 3 and 4 the hub members secured to said shaft sections, respectively. Each of these hub members is provided with a supporting base 5, and each supporting base is provided with a pair of seats 6 for bearing blocks. Each seat is shown as provided with a transverse rib 7 having a wall or face 8 which is adapted to engage the coöperating face 9 of a bearing block 10.

Each of the bearing blocks shown herein is provided with a bore 11 extending from the inner face thereof toward but not through the outer face, thereby providing a well 12 for lubricant. Mounted within each bore is a bushing 13 which receives therewithin the trunnion 14 of a cross member 15 having a central lubricant well 16 from which lubricant may be conducted through radial ports 17 in said trunnions to each of the wells 12, thereby to lubricate the bearing formed between the inner wall of the bushing 13 and the outer wall of the coöperating trunnion.

Each bearing block is provided with a stud 18 mounted within a bore 19 provided therefor in the appropriate side of its supporting base.

Extending through each end of the base 5 and across the central portion of each bore 19 is a second bore 20. This bore is tapered or inclined from one end to the other, the inclined surface being the surface which faces the seat 6. Extending through the stud 18 is a bore 21 which is adapted to register with the two parts of the bore 20, but with the side of its bore remote from the seat 6 nearer said seat than are the corresponding parts of the bore 20. Mounted in the bores 20 and 21 is a tapered pin 22 having a reduced threaded extension provided with a nut 23.

With the parts arranged as described, the pin 22 will be inserted through the bores 20 and 21 and across the bore 19. By setting up on the nut 23, the seat facing portion of the pin will bear against the corresponding portions of its bore 20, the intermediate opposite portion of said pin bearing against the corresponding portion of the core 21 and thus serving to draw the bearing block to its seat. This construction and arrangement of parts provides simple, effective, and economical means for drawing the bearing blocks to their seats and retaining them in this position. It also permits the use of bearing blocks the studs whereof do not project beyond the base 5.

Having thus described my invention, what I claim is:

In a universal joint the combination of a supporting base having a seat and a bore extending from said seat, a bearing block coöperating with said seat and having a stud adapted to enter said bore, the said base having a bore extending therethrough and across the first mentioned bore, the upper or seat facing portion of the second bore being tapered or inclined and the said stud having a bore therethrough adapted to register with the second bore and having its surface which is remote from the seat nearer the said seat than the corresponding surface of the second bore, and a tapered pin mounted in the second and third bores and adapted by its adjustment to force the bearing block to its seat.

In testimony whereof, I hereunto affix my signature.

WILLIAM H. THIEMER.